(No Model.)

E. J. HERRICK, M. G. RANDALL & W. R. MEECH.
REVERSIBLE BASKET STAND.

No. 419,169.  Patented Jan. 7, 1890.

Witnesses:
Charles W. Tufts
Lulu E. Pierce

Inventors.
Erwin J. Herrick
Walter R. Meech, Milo G. Randall
By their Attorneys
Moulton & Rogers

UNITED STATES PATENT OFFICE.

ERWIN J. HERRICK, MILO G. RANDALL, AND WALTER R. MEECH, OF GRAND RAPIDS, MICHIGAN.

REVERSIBLE BASKET-STAND.

SPECIFICATION forming part of Letters Patent No. 419,169, dated January 7, 1890.

Application filed July 16, 1889. Serial No. 317,736. (No model.)

*To all whom it may concern:*

Be it known that we, ERWIN J. HERRICK, MILO G. RANDALL, and WALTER R. MEECH, citizens of the United States, residing at Grand Rapids, in the county of Kent and State of Michigan, have invented certain new and useful Improvements in Reversible Basket-Stands; and we do hereby declare the following to be a full, clear, and exact description of the invention, such as will enable others skilled in the art to which it appertains to make and use the same.

Our invention relates to a reversible basket-stand for supporting round or grain baskets for the purpose of keeping them free from the floor, and is particularly designed for the use of grocers in making display of fruits, vegetables, grains, &c., in and about their premises; and it consists in the construction, combination, and arrangement of the parts hereinafter described, and particularly pointed out in the claims, reference being had to the accompanying drawings, in which—

Figure 1:
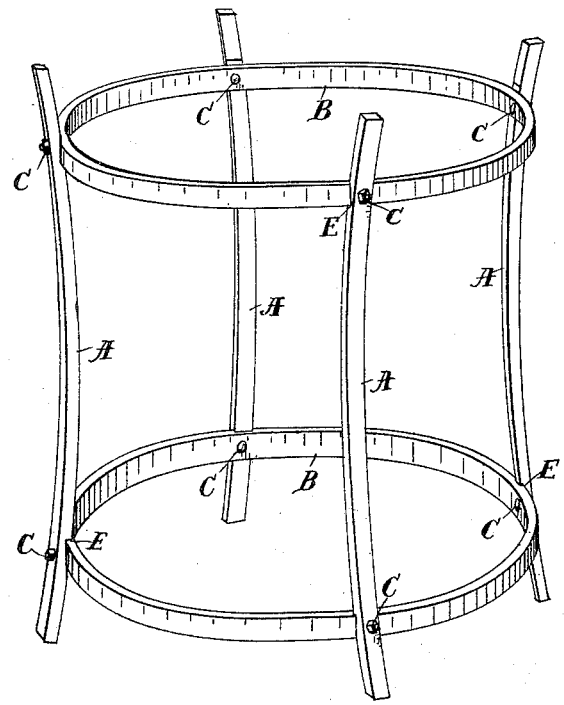
Figure 2:
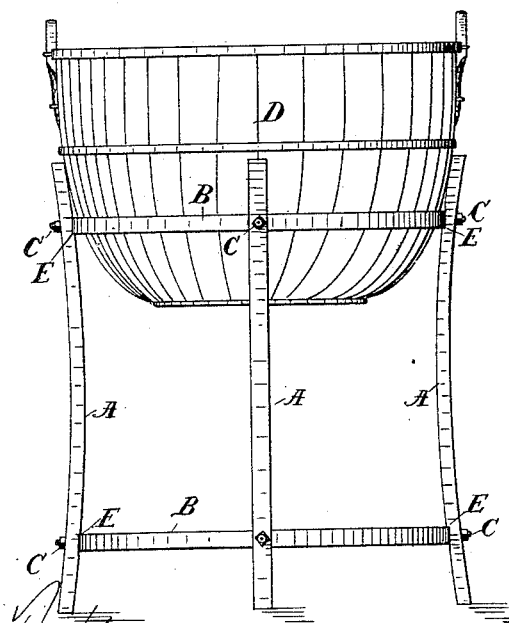

Figure 1 is a perspective view, Fig. 2 an elevation, of our improved reversible basket-stand, showing a basket in position.

Rings B are mounted upon posts or standards A, provided with step-notches E, adapted to receive the rings, which are firmly bolted to the standards by bolts C. The basket D rests in the top ring, as shown in Fig. 2, and in this position is adjustable at any angle for displaying its contents. Besides supporting the basket, the rings act as braces for imparting rigidity to the structure. The standards may be of any suitable length, but we prefer to make them about eighteen inches in length, and curved, as shown, and to make the rings sixteen and three-fourths inches inside diameter for ordinary use. It will be observed that they can be used either side up, and that baskets supported in this manner will be out of the dirt and above the reach of dogs, and that by using different lengths of standards rows of baskets may be arranged in tiers for display purposes, and that the structure, while very simple, is exceedingly strong and durable.

Having thus described our invention, what we claim as new, and desire to secure by Letters Patent, is—

1. A basket-stand consisting of rings adapted to encircle the lower portion of a basket, as D, arranged relatively one above the other, and a series of posts arranged around the periphery of said rings and secured thereto, substantially as and for the purpose specified.

2. In a basket-stand and in combination, rings adapted to encircle the lower portion of a basket, as D, arranged relatively one above the other, a series of posts having notches arranged near the respective ends thereof, adapted to said rings, and bolts for securing said rings and posts together, substantially as described.

In testimony whereof we affix our signatures in presence of two witnesses.

ERWIN J. HERRICK.
MILO G. RANDALL.
WALTER R. MEECH.

Witnesses:
DENNIS L. ROGERS,
LUTHER V. MOULTON.